March 14, 1933.  J. L. BALDWIN  1,901,279
PACKAGE CARRIER
Filed Dec. 16, 1927
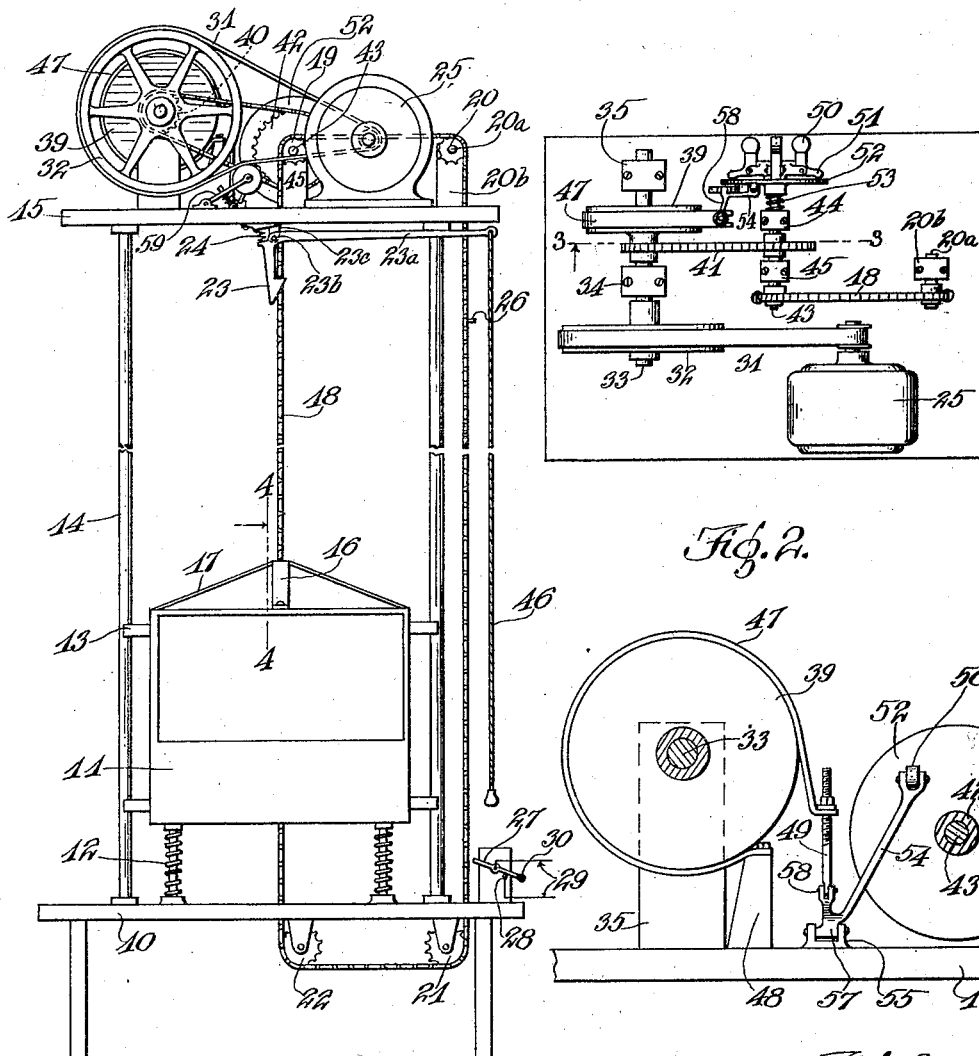

Patented Mar. 14, 1933

1,901,279

UNITED STATES PATENT OFFICE

JAMES L. BALDWIN, OF CHICAGO, ILLINOIS

PACKAGE CARRIER

Application filed December 16, 1927. Serial No. 240,492.

My invention relates to installations in stores, factories, and like establishments for the transfer of packages from one floor to another and more particularly to the apparatus immediately involved in such transfer, and my main object is to provide an apparatus of this kind which operates efficiently.

A further object of the invention is to so design the novel apparatus that it operates entirely on mechanical lines, except that its motive source is for convenience electrical.

A still further object of the invention is to utilize power only on the ascent of the package carrier, and take advantage of gravity for the descent thereof.

Another object of the invention is to so combine the gearings for the ascent and descent of the package carrier that a favorable leverage will be provided for the power element and a gradual-descent control for the carrier.

A final, but nevertheless important object of the invention is to design the mechanism with few and rugged parts, so that the same may be simple to operate and dependable.

With the above objects in view and any others that may suggest themselves from the specification and claims to follow, a better understanding of the invention may be gained by reference to the accompanying drawing, in which—

Figure 1 is an elevation of the novel apparatus, fore-shortened as to height for the saving of space;

Fig. 2 is a plan view;

Fig. 3 is an enlarged section on the line 3—3 of Figure 2;

Fig. 4 is a detail section on the line 4—4 of Figure 1; and

Fig. 5 is an interior view of a clutch element entering into the construction of the apparatus.

As is well known, package carriers of the kind mentioned are usually constructed on delicate and complicated lines, and frequently get out of adjustment and require repairs. This deficiency applies more forcefully to such carriers as depend on electrical controls for their operation, so that more or less attention must be given to them to keep them in action and proper repair. In conformity with the objects outlined, I have made it my purpose to design a carrier on simple mechanical lines, in order that its operation may be depended upon.

In the drawing, I have illustrated a carrier operative from one station to another at a higher level, but it will be apparent after an understanding of my invention that the apparatus may be extended to serve for several levels or floors by suitable modification. Thus, the lower level may be designated by a platform 10, over which the carrier 11 comes to rest, suitable spring-checks 12 being provided to cushion the descent of the carrier. The latter is of any conventional type, and is formed with lateral arms 13 for the guidance of the carrier along two rods 14 which lead from the platform 10 to a platform 15, which may be designated to represent the upper level. The carrier is formed with a top strap 16 of heavy band metal, and reinforced by suitable guy rods 17, for the provision of a lifting chain 18. This chain rises in the center of the apparatus, passing through the platform 15 over idler sprockets 19 and 20 above the latter, down through the platform 15 to the lower level, through the platform 10, under idler sprockets 21 and 22, up through the platform 10, and finally connects with the bottom of the carrier 11. The chain 18 is thus an endless one with the carrier interposed, and the immediate object is to apply power to the idler sprocket 19 whereby to raise the carrier to the desired height, to have means of supporting the carrier at such height, and to release such means to permit the carrier to descend of itself by gravity.

Assuming that the idler sprocket 19 has been imparted the power to lift the carrier, it will be noted that I provide a latch 23 under the platform 15 and in a position to be tripped by the strap 16 of the carrier (see Figure 4) as the carrier ascends to a predetermined height. As the latch 23 is backed by a spring 24, it will form a hook or support for the carrier through the agency of the strap 16 so that the carrier will remain in elevated position, the power having been cut off at the same time, as will later be described, to prevent the further lifting of the carrier. Assuming that the power source is an electric motor 25, the chain may be formed with a lug 26 operative upon a switch lever 27 on the down course of the right-hand run of the chain to draw the switch out of contact with a terminal 28 in the motor circuit 29, the switch forming the other terminal. The motor circuit has been shown in Figure 1 but in part as a matter of suggestion, and the switch may have an insulated handle 30 to again close the circuit in case it is desired that the carrier be lifted. The present expedient for the control of the motor through the medium of the chain is but an example of how this may be done with convenience; however, any other method of control which may be suitable for the purpose may be employed.

By more particular reference to Figure 2, it will be noted that I take the drive from the motor through a belt 31 to a large pulley 32, fixed on a shaft 33, which is journaled in bearings 34 and 35. Opposite the bearing 35, the shaft 33 receives a clutch assembly whose interior is shown in Figure 5. This assembly is fully described in my Patent No. 1,632,159, dated June 14, 1927, but for the present purpose I might state that the driving element 36 is carried by the shaft 33 and controls a pair of weights 37, which are adapted to spread by centrifugal force from the operation of the shaft whereby to press shoe portions 38 of the weights upon the internal periphery of the drum 39 journaled on the shaft 33. Therefore, when the shaft 33 has assumed a predetermined speed, the clutch device will engage the drum 39 to also rotate the same; and the latter carries a small sprocket 40 by means of which a chain drive 41 is transferred to a large sprocket 42 fixed on a shaft 43 situated lateraly of the shaft 33. The shaft 43 runs in bearings 44 and 45, and its inner end takes the sprocket 19 previously mentioned for the guiding of the chain 18 across to the sprocket 20, whose spindle 20a is journaled in a bearing 20b. This mechanism constitutes the drive for the chain 18, and it will be evident that by the use of the small sprocket 40 as against the larger sprocket 42 I gain a considerable leverage, so as to enable the motor to pull the heavy load; also, by the interposition of the clutch, I enable the motor to attain a sufficient speed before engaging the lifting gearing, this engagement being effected by the gradual operation of the clutch device of Figure 5, so that the motor suffers no strain in negotiating the load.

Considering that my apparatus is designed for relatively heavy loads, I have provided a checking device for the control of the carrier as it is caused to descend by gravity. As is recalled, the latch 23 induces this motion by releasing the carrier strap 16, and I provide a control for the latch by the use of a pull-cord or cable 46, whose upper end I attach to a long lateral extension 23a of the latch 23, such extension being held beyond the pivot 23b of the latch by a suitable support 23c carried by the platform 15. Thus, through the length of the extension 23a, I secure a great leverage to effect the withdrawal of the latch 23 from the carrier strap 16, that the carrier may be released for the descent. As the carrier descends, it will induce the rotation of the shaft 43 and the operation of the chain 41 and drum 39 in a direction reverse to the former one; however, the rotation of the drum will have no effect upon the clutch device and the shaft 33 supporting the same, so that the shaft 33 and the motor 25 will remain motionless.

To prevent the sudden descent of the carrier, I utilize the medium of a brake for the drum 39 in the form of a band 47. One end of this band is made fast to a pillar 48 mounted on the platform 15, while the other end is attached adjustably to a draw-bolt 49, whose pull tightens the band 47 about the drum 39. To actuate the draw-bolt 49, I have provided the outer end of the shaft 43 with an expanding governor-assembly 50, whose fingers 51 are effective upon a disk 52 journaled on the shaft 43 and backed by an expanding spring 53. In order that the disk 52 may be evenly urged by the expansive action of the governor 50, I construct the latter with a cluster of four or more units. The backing of the disk is effective upon an arm 54, pivoted in a bearing 55 on the platform 15, the arm carrying a roller 56 in contact with the back of the disk. The arm has an extension 57 in the direction of the draw-bolt 49, such extension meeting the lower end of the latter with a pivot joint 58. It will be seen, that as the disk 52 is backed by the excessive rotation of the shaft 43, the arm 54 will be swung accordingly to pull down on the draw-bolt 49 and operate the brake, checking the descent of the carrier through the control of the shaft 43 through the medium of the chain 41. By properly designing the governor 50, the descending speed of the carrier may be accurately governed, and the braking action made smooth and gradual, whereby to render the descent of the carrier uniform. In Figure 1, I have shown a conventional automatic take-up device 59 for the lower run of the belt 31, so that the latter may always operate efficiently.

The above description covers the mechanism, and it will be seen that the same is a simple assembly, which may be constructed of rugged parts and needs no fine or delicate adjustments. The mechanism provides a balance or harmony between the lifting gearing and the descent control, by the use of parts which are cooperatively geared with a certain relation. The apparatus is therefore of a simple and compact nature, which is an advantageous factor when cost and space are considered. The apparatus is intended to occupy a more or less remote or out-of-the-way site, and I have therefore designed it for a minimum of attention.

While I have described and illustrated the invention in the preferred embodiment, it will be seen that the same is capable of many minor changes and refinements, and it is my desire to claim such changes and refinements, as coming within the spirit and scope of the appended claims.

I claim:—

1. An elevator lift comprising a power element, a driving clutch member operated by said power element, a driven clutch member automatically engaged by the driving clutch member when the power element has attained a suitable value, an elevator-operating shaft, a reduction-gearing between said driven clutch member and said shaft for the operation of the carrier in the lifting direction, a brake effective upon said driven clutch member, and a speed-responsive device energized by said shaft when the shaft is rotated at excess speed in the lowering direction to apply said brake.

2. An elevator comprising a looped drive, a carrier interposed in the latter, a power element to operate said drive in the lifting direction, a latch to support the carrier after it has been lifted to a predetermined height, an element to de-energize the power element when the carrier intercepts the latch, and a releasing element for the latch to unseat the carrier for descent.

3. An elevator comprising a carrier, an element supporting the latter in suspension and operable to lift the carrier, a power source, a driving clutch member operated by the latter, a driven clutch member geared to said element and automatically engageable by the driving clutch member when the power source attains a speed sufficient to lift the carrier at a moderate rate of travel, and a brake for the driven clutch member and energized by the reverse operation of the element from the excessive descending speed of the carrier.

4. An elevator comprising a carrier, an element supporting the latter in suspension and operable to lift the carrier, a power source, a driving clutch member operated by the latter, a driven clutch member geared to said element and automatically engageable by the driving clutch member when the power source attains a speed sufficient to lift the carrier at a moderate rate of travel, a speed-responsive device actuated by the element in the event of the excessive descending speed of the carrier, and a brake for the driven clutch member and energized by the operation of the speed-responsive device.

5. An elevator comprising a carrier, an element supporting the latter in suspension, a power means for raising the carrier, means automatically cutting off said power means when the carrier has been raised to a predetermined height, and a device automatically effective at such time to engage and support the carrier in the raised position.

In testimony whereof I affix my signature.

JAMES L. BALDWIN.